Figure 1:
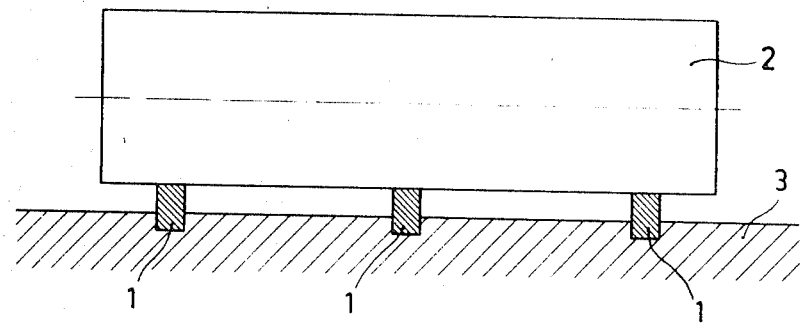

United States Patent

[11] 3,591,243

[72] Inventors Wilhelmus Franciscus Knippenberg;
Gerrit Verspui, both of Emmasingel,
Eindhoven, Netherlands
[21] Appl. No. 815,657
[22] Filed Apr. 14, 1969
[45] Patented July 6, 1971
[73] Assignee U.S. Philips Corporation
New York, N.Y.
[32] Priority Apr. 18, 1968
[33] Netherlands
[31] 6805443

[54] BEARING ELEMENTS
11 Claims, 7 Drawing Figs.
[52] U.S. Cl. ................................................ 308/241,
117/46, 117/106
[51] Int. Cl. ...................................................... F16c 1/24
[50] Field of Search ........................................... 308/241;
117/46 CG, 106 A

[56] References Cited
UNITED STATES PATENTS
2,487,581 11/1949 Palumbo ...................... 117/46 CG
3,335,345 8/1967 Diefendorf .................. 117/46 CG
3,451,867 6/1969 Taft, Jr. et al. ................ 117/106 A
3,084,005 4/1963 Whitfield et al. ............. 308/241
3,127,224 3/1964 Owens et al. ................. 308/241

Primary Examiner—Fred C. Mattern, Jr.
Assistant Examiner—Wesley S. Ratliff, Jr.
Attorney—Frank R. Trifari ABSTRACT: A bearing formed of a base having a bearing surface consisting of coherent pyrolytic silicon carbide which is either soldered or cemented to the base or formed on the base.

PATENTED JUL 6 1971

3,591,243

SHEET 1 OF 2

INVENTORS
W. F. KNIPPENBERG
BY G. VERSPUI

AGENT

BEARING ELEMENTS

The invention relates to bearing elements suitable for supporting structural parts in case of both gliding and rolling friction. The quality of such elements is determined mainly by the mechanical interaction of their active surfaces with those of the structural parts to be supported, that is to say, friction, adhesion and wear. Different properties of the materials from which the parts moving relative to one another are built up influence these mechanical parameters. Thus, for example, plastic and elastic deformations, heat conductivity, and chemical resistance play an important part.

Very hard minerals and synthetic substances such as diamond sapphire, agate and carbides of transition metals have been used as materials for bearing elements upon which very strict requirements are imposed. In combinations of bearing elements built up from such hard materials with structural parts particularly of softer materials such as metals, a slight roughness of the active surfaces is of course important to inhibit wear.

The possibilities of the use of these materials are, however, limited. On the one hand they are expensive for bearing elements of more than minimum dimensions and on the other hand the design presents difficulties in many cases.

It is an object of the invention to obviate these drawbacks and to compose bearing elements by suitable choice of material which may be used for a large range of bearing structures, also of large dimensions and for high load, even without the use of lubricants. The invention relates to bearing elements and is characterized in that at least the active parts thereof consist of coherent pyrolytic silicon carbide. In this connection pyrolytic silicon carbide is to be understood to mean any coherent body of silicon carbide formed because at least one of the composite components (silicon and carbon) is absorbed from a gas phase.

Different methods are known for the pyrolytic formation of silicon carbide bodies, namely:

1. Siliconizing graphite bodies with the aid of a volatile silicon compound, for example, vapor of silicon oxide formed by reduction of silicon dioxide with hydrogen.
2. Carburetion of silicon bodies in an atmosphere which contains a volatile carbon compound, for example, propane.
3. Separation on a substrate from an atmosphere in which both carbon and silicon are present, for example, an atmosphere which contains a carbon-containing silane such as a methyl chlorosilane or a mixture of a hydrocarbon and a silane.
4. Separation on a substrate by sublimation.

The bearing elements consisting of pyrolytic silicon carbide have the special advantage that they can be used in combination with structural parts consisting of all materials suitable therefor including silicon carbide itself and other known hard minerals and synthetic substances.

This is associated with the particularly great hardness and resistance to wear of the coherent pyrolytic silicon carbide, particularly if the size of the crystallites is in the order of microns. As is known the size of the crystallite may be adjusted with the aid of the parameters employed in the formation of the coherent pyrolytic silicon carbide. In this respect the ratio between silicon and carbon, the partial pressure of these substances of their compounds in the gas atmosphere, the overall pressure of the atmosphere, the flow rate of the gas and the temperatures used which are generally between 1000° and 2600° C. are of influence. Furthermore the pyrolytic formation has the advantage that the bearing elements are directly obtained in substantially the exact shapes and dimensions so that only a slight finishing operation is required.

An additional advantage is the slight plastic and elastic deformation in a wide range of temperatures, the high heat conductivity, and the great chemical resistance so that high load at high temperatures and in aggressive media is possible. As already indicated above, for a bearing to be resistant to wear, it is only important that the active surfaces of the elements consist of coherent pyrolytic silicon carbide. Therefore, part of the substrate on which the silicon carbide is deposited can be maintained in many cases and a full conversion is not necessary for reactions at which carbon or silicon is converted into silicon carbide. Bearing elements may alternatively be obtained by soldering or cementing pieces of the silicon carbide on a support.

In order that the invention may be readily carried into effect, a few embodiments thereof will now be described in detail by way of example, with reference to the accompanying diagrammatic drawings, and a few examples.

EXAMPLE I

Coherent pyrolytic silicon carbide was formed by deposition from a hydrogen stream including 1 percent of $CH_3SiHCl_2$ of 5 liters per minute on a substrate of carbon at a temperature of 1500° C. As shown in FIG. 1, blocks of 3×2×2 mm. were sawed therefrom. These blocks are used as spacer bearings between a roller of electrolytic copper 2 having a diameter of 145 mm. and a steel sheet 3. The loaded sides of the spacing elements are polished to a surface roughness of less than 0.1 $\mu$m. with the aid of polishing powders consisting of aluminum oxide.

The roller 2 was loaded with 10 kg. in atmospheric air and was given a motion of 45 r.p.m. at a longitudinal transport of 22 $\mu$m. per revolution. After 3 months no wear at all could be measured (measuring accuracy one-half $\mu$m.).

EXAMPLE II

Figure 2:
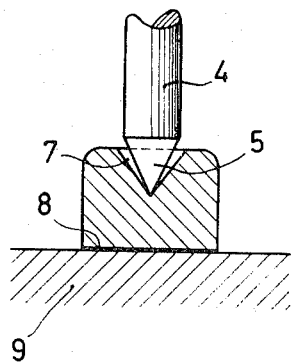
Figure 3:
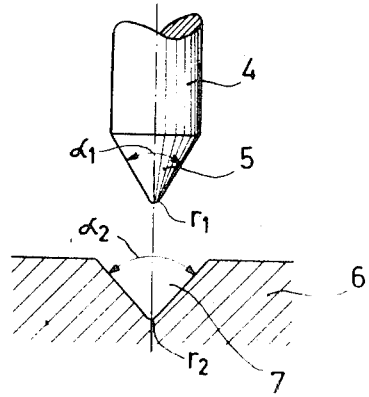

A steel spindle 4 having a diameter of one-half mm. provided with a point 5, an angle $\alpha_1$ of 60° having a curved radius $r_1$ of 0.09 mm. was supported in a piece of silicon carbide 6 sublimated at 2,600° C. as shown in FIGS. 2 and 3 in which piece a conical cavity 7 at an angle $\alpha_2$ of 80° and a curved radius $r_2$ of 0.12 mm. was provided. The piece of silicon carbide 6 was soldered on a steel support 9 by means of gold containing 5 percent of tantalum 8. The active surface in the cavity 7 was carefully polished. Upon loading the spindle 4 with 1 g. no wear in the pivot bearing thus formed was measurable at 200 r.p.m. after 6 months.

EXAMPLE III

Figure 4:
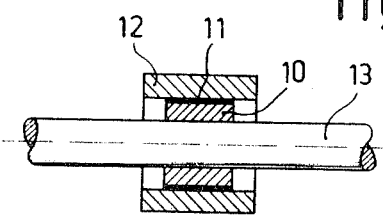

A graphite cylinder having an internal diameter of 20 mm. and an external diameter of 24 mm. was treated at 2,200° C. with the vapor of silicon oxide developed at 1,600° C. from a pulverulent mixture of silicon oxide and carbon in a hydrogen stream of 2 liters per minute. After 20 hours the graphite was converted into pyrolytic silicon carbide up to a depth of approximately 1 mm. One piece 10 having a length of 5 mm. was soldered and internally polished, as shown in FIG. 4, by means of an alloy of aluminum and silicon (87-13)11 in a holder 12 of stainless steel. The entire unit was used as a bearing bush for a steel spindle 13. After operation of the spindle at 300 r.p.m. without a lubricant in air, no wear occurred after 1 month.

EXAMPLE IV

Silicon pellets of 0.2 mm. diameter were heated at 1,220° C. in carbon powder in an argon stream of 1 liter per minute for 40 hours, at which full conversion into silicon carbide took place. The pellets were subsequently converted for 1 hour at 2,200° C. in an argon atmosphere into the hexagonal modification in a space surrounded by silicon carbide.

The pellets obtained were brought to a rotating motion in a cylindrical vessel having a lining of boron carbide by means of a stream of air which was supplied by an inlet provided laterally and was removed through an outlet provided in the bottom of the vessel. The surface was ground and polished. After being brought to the correct dimensions the pellets fell from the vessel through the outlet which was provided with an accurately proportioned aperture. The accurately proportioned pellets thus obtained may be used in a normal steel ball bearing.

Figure 5:
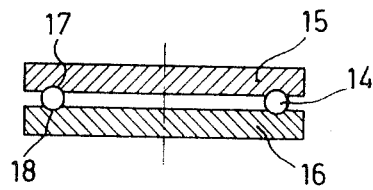

FIG. 5 shows a ball cushion of high quality by combination of the balls 14 with two plates 15 and 16 of silicon carbide, which have been obtained, for example, by pyrolytic reaction in the same manner as the balls 14 which are provided with fitting polished grooves 17 and 18.

EXAMPLE V

Figure 6:
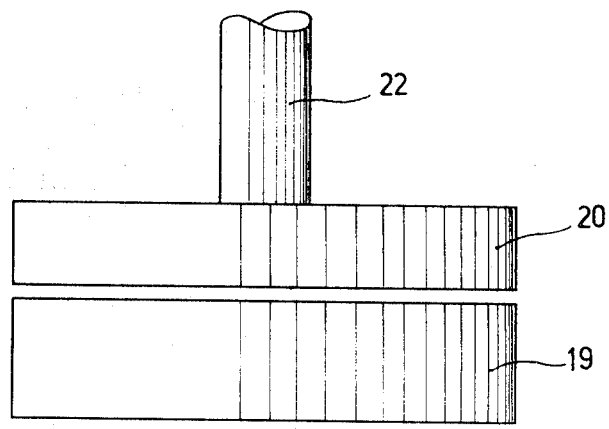
Figure 7:
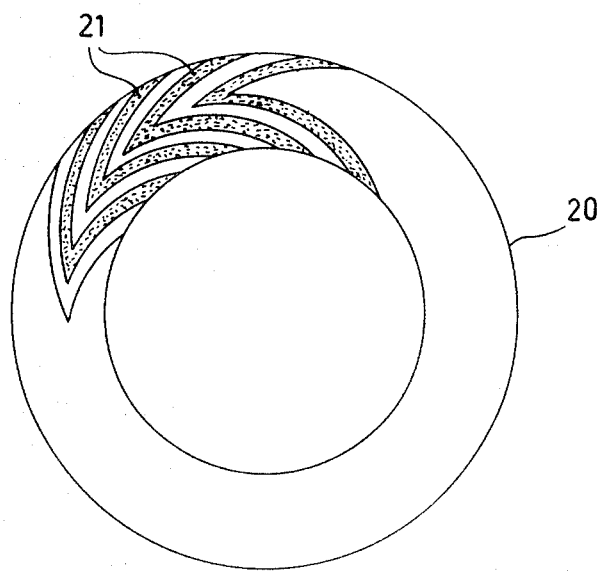

A disc of pyrolytic silicon carbide 19 obtained in the manner as described in example I has a diameter of 30 mm. and a thickness of 5 mm., see FIG. 6. A disc of pyrolytic silicon carbide 20 which may be obtained in the same manner and which may have the same dimensions as the disc 19 was provided with spiral-shaped grooves 21 having a depth of 20 $\mu$m. The grooves may, for example, be formed in a herringbone pattern as is shown in FIG. 7. A steel shaft 22 having a diameter of 15 mm. is soldered to disc 20 by means of an alloy of gold containing 5 percent of tantalum.

The spiral groove bearing obtained has a speed of 50,000 r.p.m. in working condition and then operates as a gas-lubricated, preferably as an air-lubricated bearing. Upon starting and stopping, contact occurs between the two supporting surfaces of the bearing facing each other. This bearing does not show measurable phenomena of wear, not even at very frequently interrupted operation.

What I claim is:

1. In combination, two elements having respective surfaces in mutual contacting and moving relationship relative to each other, at least one element having mechanical load-bearing capacity and comprising a base part and a bearing part having a contacting surface of coherent pyrolytic silicon carbide.

2. A combination according to claim 1 wherein said bearing part is formed independently of the base part and subsequently adhered thereto.

3. A combination according to claim 1 wherein said bearing part is formed directly on the base part.

4. A combination according to claim 2 wherein the base part is soldered thereon.

5. A combination according to claim 2 wherein the base part is graphite and the bearing part is secured thereon.

6. A combination according to claim 1 wherein the base part and the bearing part are both coherent pyrolytic silicon carbide.

7. A bearing member for contact and cooperation with a second member, the bearing member comprising coherent pyrolytic silicon carbide formed as a body part and an exposed contacting surface for contacting and moving relative to said second member.

8. A bearing element comprising a bearing member according to claim 7 and further comprising a base part of a material different from the silicon carbide, the bearing member being adhered to the base part.

9. A bearing element according to claim 8 wherein the base part is graphite.

10. A bearing element according to claim 8 wherein the base part is a metal such as steel.

11. A method of making a bearing member according to claim 7 comprising flowing a stream of hydrogen including 1 percent $CH_3SiHCl_2$ at 5 liters per minute on a substrate of carbon at a temperature of 1,500° C., and thereby depositing coherent pyrolytic silicon on said carbon.